United States Patent [19]
Slooten

[11] 3,717,132
[45] Feb. 20, 1973

[54] VALVE ROTATOR
[75] Inventor: Louis J. Van Slooten, West Olive, Mich.
[73] Assignee: General Motors Corporation, Detroit, Mich.
[22] Filed: Nov. 5, 1971
[21] Appl. No.: 195,982

[52] U.S. Cl. .....................123/90.3, 74/88, 137/331
[51] Int. Cl. .............................F01l 1/32, F16k 29/00
[58] Field of Search ........251/337; 123/90.28, 90.29, 123/90.3; 137/331; 74/88, 128

[56] References Cited
UNITED STATES PATENTS

| | | | |
|---|---|---|---|
| 2,624,323 | 1/1953 | Thorne | 123/90.3 |
| 2,758,583 | 8/1956 | Norton | 123/90.3 |
| 2,827,886 | 3/1958 | Geer | 123/90.3 |
| 2,841,128 | 7/1958 | Aiken | 123/90.29 |
| 2,863,428 | 12/1958 | Norton | 123/90.3 |
| 3,421,734 | 1/1969 | Updike et al. | 251/337 |

Primary Examiner—Al Lawrence Smith
Attorney—J. L. Carpenter et al.

[57] ABSTRACT

A valve rotator having a spring washer interposed between a spring retainer collar and a retainer cap, a plurality of radial ball-ramps being provided in the retainer cap with a ball positioned in each of the ramps in rolling contact with the spring washer, the balls being retained therein and biased radially inward by means of an annular spring engaging all of the balls.

7 Claims, 4 Drawing Figures

PATENTED FEB 20 1973　　　　　　　　　　　　3,717,132

VALVE ROTATOR

This invention relates to a spring loaded rotatable member and, in particular, to a valve rotator.

Specifically, this invention relates to a device for rotating a poppet valve and, in particular, to a readily installed self-contained valve rotator to impart rotary movement to a poppet valve each time the head of the valve is moved from its seat.

A number of different types of devices have been used in the prior art to effect valve rotation, one such type valve rotator includes a retainer cap carrying shiftable elements, such as balls, and a resilient member which is deflected under increased load to transfer the spring load from the retainer cap to the shiftable elements whereupon the load on the shiftable elements causes them to rotate and produce rotation between the retainer cap and an adjacent nonrotatable member. In this type of prior art device, each of the balls is positioned in an arcuate grooved ramp in the retainer cap with each of the balls being biased by a spring positioned in each groove in abutment against the ball with which it cooperates. In these devices, with the ball movable in a fixed path as determined by the arcuate groove, the balls act on a limited portion of the highly stressed resilient member so that rapid galling thereof occurs. In addition, in such an assembly using, for example, six balls as the shiftable elements, a minimum of fifteen parts are required to form each assembly of this type valve rotator.

It is therefore a principal object of this invention to provide an improved valve rotator having a reduced number of parts which is easy to assemble.

Another object of this invention is to provide an improved valve rotator whereby the load of the shiftable elements of the unit is distributed over a relatively large area of the resilient member of the valve rotator.

These and other objects of the invention are attained by means of a valve rotator structure including a spring retainer collar and a retainer cap having a Belleville-type spring washer interposed therebetween. The retainer cap is provided with a plurality of radial ball-ramps, each of which receives a shiftable element in the form of a ball which is in rolling contact with the Belleville spring washer, the radial ball-ramps guiding the balls for radial movement in addition to the normal tangential ball movement to allow the high unit load associated with the balls to be distributed over a relatively large area on the surface of the Belleville spring washer. Each of the grooves is open at its radially outward end to permit a single spring member to be used to normally bias all of the balls simultaneously, radially inward.

For a better understanding of the invention, as well as other objects and further features thereof, reference is had to the following description of the invention to be read in connection with the accompanying drawings, wherein.

Figure 1:
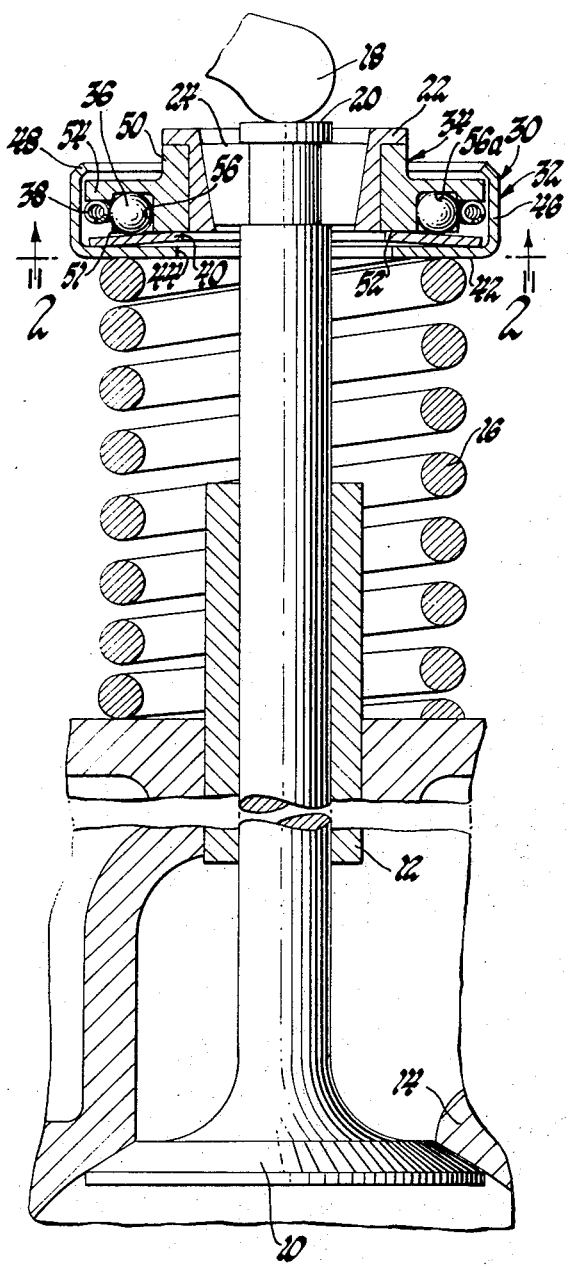
FIG. 1 is a sectional view of a valve rotator in accordance with the invention mounted on a poppet valve of an internal combustion engine.

Referring now to the drawings, and in particular to FIG. 1, a conventional poppet valve 10 is mounted for reciprocation and rotation in a guide 12 of the cylinder head 14 of an internal combustion engine, not shown. The valve 10 is reciprocated by a coil return spring 16 acting in response to valve opening movement induced by an engine driven valve rocker 18 acting against the top of the valve stem 20. As shown, the return spring 16 seats at its lower end against the cylinder head and at its upper end against the spring retainer collar 32 of the valve rotator of the invention, generally designated 30, which is secured to the valve stem by a flanged retainer 22 which is fixed as by conventional wedging keepers 24 to the valve stem.

Figure 2:
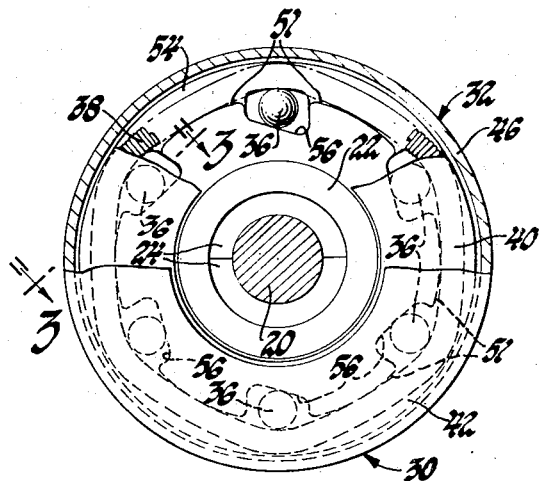
FIG. 2 is a sectional view taken along line 2—2 of FIG. 1.

The valve rotator 30, in the embodiment shown in FIGS. 1 and 2, includes the spring retainer collar 32, acted on by the spring 16, a retainer cap 34 held on the valve stem by the flanged retainer 22 and keepers 24, a plurality of balls 36 carried in inclined radial ball-ramp grooves in the retainer cap 34 which are normally biased radially inward by a coiled garter spring 38, and a spring washer 40, in the form of a Belleville spring which is conical in shape when in a free state, positioned between the spring retainer collar 32 and the retainer cap 34.

The spring retainer collar 32 includes a radially extending flange portion 42 with a central opening 44 therethrough, an axial extending flange portion 46 extending therefrom, which terminates in a radial inward extending lip 48, the latter being rolled over to the position shown after assembly of the valve rotator to a position to engage the outer rim of the retainer cap 34, as seen in FIG. 1 to limit axial movement of the latter within the collar.

Retaining cap 34 is provided with an axial extending hub portion 50 having a lower end surface 52 against which the inner edge of spring washer 40 is seated, the outer edge of the spring washer being seated on the flange portion 42 of the retainer collar 32. Extending radially outward from the hub portion is a flange 54, the underside of this flange and the outer lower peripheral portion 51 of the hub portion being formed with radial ball-ramps 56, six such ramps being provided in the embodiment disclosed.

Figure 3:
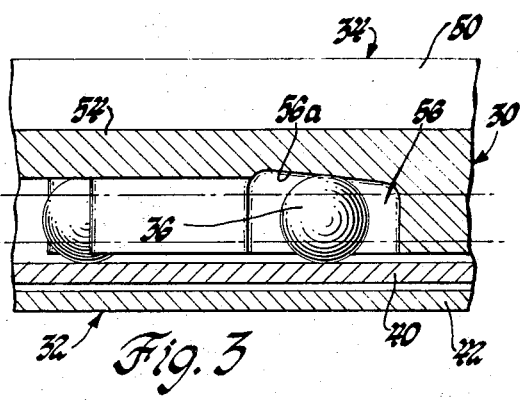
FIG. 3 is a sectional view taken along line 3—3 of FIG. 2.

As can be seen in FIG. 2, each ramp 56 is formed in such a manner as to guide a ball 36 therein to effect both tangential and radial movement of the ball. In addition, the upper surface or ramp surface 56a of each ramp, lower surface as seen in FIG. 3, is inclined at an angle to effect axial movement of a ball relative to the valve stem.

Although the inward radial walls of the grooves are shown as being straight in FIG. 2, they could be curved in the form of a helix so that the grooves with their ramp surfaces 56a would in effect be in the form of a section of a conical-helix.

The relative width of each of the ramps 56 is such that a portion of a ball 36 positioned therein will always extend radially outward from the outer lower peripheral portion 51 of the retainer cap. This is to permit the balls to be normally biased radially inward toward the shallow end of the inclined surfaces 56a of the grooves by engagement with a suitable single annular spring member encircling the balls and the lower peripheral portion 51.

Figure 4:
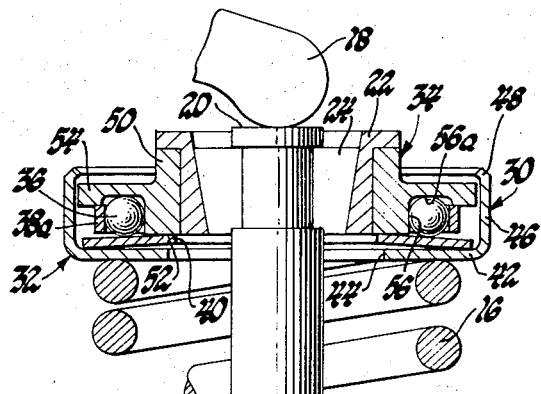
FIG. 4 is a sectional view similar to FIG. 1 showing an alternate embodiment of a valve rotator in accordance with the invention.

In the embodiment shown in FIGS. 1 and 2, the annular spring member is in the form of a coiled garter spring 38. In the embodiment shown in FIG. 4, where like reference numerals indicate like parts, the annular spring member is in the form of a split annular metal spring ring 38a of rectangular cross section. However, it is to be realized that the annular spring member can be of differing types, such as, for example, a multiple, tightly coiled spring of two or three coils, not shown, since such a spring would be comparable in shape, but not in size or diameter of spring wire used therein, to the return spring 16.

The spring washer 40 should be of the desired stiffness so that when the valve 10 is in its closed position, as shown in FIG. 1, the main load of return spring 16 is carried by the spring washer 40 with its outer edge engaging the spring retainer collar 32 and its edge engaging the lower end surface 52 of retainer cap 34. However, when the load force of the return spring 16 increases, as when the valve 10 is lifted from its seat, the spring washer 40 should deflect and bow under this increased spring load so that this load is transferred to the balls 36 in the grooves of retainer cap 34.

Thus, in operation and with reference to FIGS. 1, 2 and 3, when the valve 10 is in the closed position, the spring washer 40, still conical in shape, carries the main load of return spring 16 with its inner edge in forced engagement against the lower end surface 52 of the retainer cap. At this time, the spring member 38 biases the balls 36 radially inward toward the shallow end of the grooves with the balls engaged between the inclined surface 56a of the retainer cap and the upper surface of the spring washer 40.

When the valve 10 is lifted from its seat, the load force of the return spring 16 increases and, as this occurs, the spring washer 40 will deflect and bow under this increased spring load to transfer this load to the balls 36 in the grooves of retainer cap 34 with the inner edge of the spring washer then only lightly engaging the lower end surface 52 of the retainer cap. This transferred load on the balls causes them to roll down the inclined surface 56a of the grooves against the biasing action of spring 38 to thereby effect rotary movement of the retainer cap 34 relative to the spring retainer collar, the latter being in effect fixed against rotation by engagement with return spring 16. This rotation of the retainer cap 34 relative to the spring retainer collar will effect rotation of the valve 10.

When the valve 10 is again moved from its open position toward its closed position, the load on return spring 16 decreases so that this load is once again carried by the spring washer 40. Thus, as the spring washer 40 again returns to its conical configuration as shown in FIG. 1, its inner edge will once again engage the lower end surface 52 of the retainer cap 34 in the meantime releasing the load on the balls 36. As this load is taken off of the balls 36, the annular spring member 38 can then again bias the balls radially inward and toward the shallow end of the grooves 56 so that these balls are once again snugly engaged between the surface of the spring washer 40 and the inclined surface 56a of the grooves. This latter movement of the balls 36 occurs without relative rotational movement between the spring retainer collar 32 and the retainer cap 34, since at this time, the inner edge of the spring washer 40 is once again in loaded frictional contact with the lower end surface 52 of the retainer cap.

From the above description, it is apparent that the radial movement of the balls in addition to the normal tangential movement of the balls allow the high unit loading normally associated with these rotator balls to be distributed over a relatively large area of the spring washer surface, thereby reducing spring washer wear caused by contact from the rotator balls. Thus, the radial movement of the balls eliminates severe Belleville washer brinelling and surface metal fatigue, providing for increased rotator life. In addition, for a given ball ramp incline and a given length of ball travel, a valve rotator with radial ball-ramps in accordance with the invention will have a slower rate of rotation for a given engine speed than valve rotator with balls in arcuate ball-ramps to thereby effect a reduction in valve seat recession when nonleaded fuels are used.

What is claimed is:

1. A device for effecting relative rotation between two parts when subjected to an increased axial load which comprises a first part and a second part longitudinally aligned on a common axis for rotation relative to each other and adapted to be axially loaded, a resilient member positioned between said first part and said second part and arranged to transmit normal axial loads from said first part to said second part, said second part being provided with a plurality of radial, inclined ball-ramp grooves, a ball element in each of said grooves in position to engage one side of said resilient member and a single annular spring means encircling said second part in position to engage said balls to normally bias them radially inward whereby said balls are adapted to rotatably drive said second part relative to said first part whenever said resilient member is deflected under an increased axial load so the load is transferred to said balls by said resilient member.

2. A device for effecting relative rotation between two parts when subjected to an increased axial load which comprises a first part and a second part longitudinally aligned on a common rotational axis and adapted to be axially loaded, a conical shaped spring washer positioned between said first part and said second part and arranged under a normal axial load so that its outer edge engages said first part and its inner edge engages said second part, said second part being provided with a stepped annular radial extending flange with a plurality of radial, inclined ball-ramp grooves therein, a ball element in each of said grooves and positioned to engage one side of said spring washer between said outer edge and said inner edge and an annular spring encircling said flange in position to engage said balls to normally bias them radially inward whereby said balls are engaged between said spring washer and said ball-ramp grooves to rotatably drive said second part relative to said first part whenever said resilient member is deflected under an increased axial load so that the load is transferred to said balls.

3. A device according to claim 2 wherein said annular spring is an annular coiled garter spring.

4. A device according to claim 2 wherein said annular spring is an annular split ring of rectangular cross section.

5. A valve rotator for a poppet valve which is adapted to be mounted on the valve stem thereof, said valve rotator consisting of a retainer cap adapted to be fixed to the valve stem, a spring retainer collar encircling the valve stem and having a flanged portion to seat a valve spring, a spring member positioned between said spring retainer collar and said retainer cap and arranged to transmit normal axial loads from said spring retainer collar to said retainer cap, said retainer cap having a stepped annular flange with radial inclined ball-ramps therein, a ball positioned in each of said ramps for rolling contact with the resilient member, and an annular spring encircling said stepped annular flange of said retainer cap in position to engage said balls to normally bias them radially inward for snug engagement between said resilient member and the surface of said ramps.

6. A valve rotator according to claim 5 wherein said spring member is a Belleville spring and wherein said annular spring is a coiled garter spring.

7. A valve rotator according to claim 5 wherein said spring member is a Belleville spring and wherein said annular spring is a split annular ring of rectangular cross section.

* * * * *